Patented Feb. 3, 1942

2,271,696

UNITED STATES PATENT OFFICE 2,271,696

CONDITIONED WELL DRILLING FLUID

Philip H. Jones, Redondo Beach, Calif., assignor to Union Oil Company of California, Los Angeles, Calif., a corporation of California No Drawing. Original application January 20, 1936, Serial No. 59,889. Divided and this application January 24, 1939, Serial No. 252,593

5 Claims. (Cl. 252—8.5)

This invention relates to well drilling fluids, and particularly to fluids comprising solids in suspension in a liquid, for example, muds ordinarily employed in connection with the drilling operations of oil and gas wells or other borings through earth strata. This application is a division of my copending application, Serial No. 59,889 for Conditioned well drilling fluid, filed January 20, 1936.

The objects of this invention are to provide a drilling fluid of sufficient weight to insure proper control of the pressures of the penetrated formation within the well, having formation sealing properties which allow a minimum of loss of liquid to the penetrated formation, thin mud cake formation tendencies upon the walls of the penetrated formation, freedom from the tendency of gas-cutting and the attendant danger of loss of control of the well, and having physical and chemical stability.

This invention resides in a modified well drill fluid comprising a heavy suspension of solids in a liquid to which has been added a formation penetration inhibitor or sealing agent. This invention also resides in a modified well drilling fluid comprising a heavy suspension of solids in a liquid to which has been added a formation sealing agent and an anti-foaming agent. This invention more specifically resides in a drilling fluid comprising mud with admixture of a small percentage of a formation sealing agent, an anti-foaming agent, and a preservative.

In drilling wells for oil and gas by rotary tool methods it is common practice to circulate a drilling fluid known as the drilling mud down through the drill pipe and bit and return through the earth boring. The circulated drilling fluid serves to lubricate the drill pipe, cool the bit, carry the cuttings out of the hole to the surface, and to seal and hold the penetrated formation wall in place. It is also an important function of the drilling mud to prevent the escape of gas and other high pressure fluids from the penetrated formations into the bore hole. Since prevention of the entrance into the bore holes of the high pressure fluids is prevented by the hydrostatic head of the mud fluid, it is desirable that this fluid should have a maximum density compatible with its other desirable characteristics and weighting materials, such as barytes, hematite and finely divided iron may be employed for such increase in density.

The existence of an excess of hydrostatic head of the drilling fluid in the bore hole over that in the formation, however, results ordinarily in the penetration and loss to the formation of a quantity of the liquid portion of the drilling fluid and also results in the formation of a cake of the solids on the formation wall from which the liquids have thus been removed by penetration or infiltration into the formation. Many formations which have great structural strength when dry or undisturbed, lose their strength to a great degree when penetrated by the drill and saturated by the liquid from the drilling fluid. This penetration of the liquid portion of the drilling fluid into the exposed formation results in what has commonly been known as swelling, caving, loss of circulation and damage to productive sands.

It has been discovered that certain materials when added to the drilling fluid are effective in sealing and preventing or substantially inhibiting the penetration of the liquid from the drilling fluid into the porous formations. Some of the most effective of these formation sealing agents are, by way of illustration, corn starch, wheat fluor, quebracho and psyllium seeds. In practice, it has been found necessary to add these substances to the drilling mud in quantities ranging from 0.05% to 3.0% by weight of the mixed mud in order to reduce the penetration of the formation by the drill mud liquid to a small fraction of that resulting when untreated muds are employed in drilling. The mud cake thickness formed on the formation wall is also at the same time greatly reduced.

Table I indicates the effectiveness of some of these materials in admixture in small percentage with a typical drilling mud in inhibiting fluid penetration into drilled formations.

Table I

| Drilling fluid | Weight of mud, lb./cu. ft. | Funnel visc., seconds | Temp. of test, °F. | Pressure of test, lb./sq. in. gauge | Water forced from mud through core | | Thickness of mud cake, in. |
|---|---|---|---|---|---|---|---|
| | | | | | Total in 2 hours | Ml. per hr. last 30 min. | |
| Typical mud A | 73.7 | 32.2 | 200 | 2,000 | 49.8 | 18.5 | 0.27 |
| Typical mud A+0.7% white flour | 71.8 | 27.0 | 200 | 2,000 | 15.5 | 6.1 | Trace |
| Typical mud A+2.06% white flour | 70.2 | 30.0 | 200 | 2,000 | 14.4 | 4.8 | Trace |
| Typical mud A+2.04% corn starch | 69.6 | 30.0 | 200 | 2,000 | 11.5 | 4.2 | Trace |
| Typical mud A+0.25% (a) quebracho crystals | 74.2 | 33.0 | 200 | 2,000 | 15.3 | 3.0 | Trace |

Percentages are by weight.
White flour was cooked in water at boiling temperature for twenty-five minutes.
Corn starch was cooked in water at boiling temperature for twenty-five minutes.
(A) Coalinga red mud.
(a) Tan bark extract.

A definition of funnel viscosity may be found in an A. P. I. paper by H. N. Marsh and Harvey Lytel, October, 1930.

The white flour and corn starch may be prepared for use in the drilling fluid by first cooking in water at boiling temperatures for approximately one-half hour. The paste thus formed may be added to the drilling mud either prior to or during circulation thereof to the drill hole by any convenient means. The flour or starch may be added in dry form directly to the drilling mud, where the mud temperatures are moderately high, by means of a jet mixer similar to that employed for cement mixing in well cementing operations.

The psyllium seeds are preferably prepared by first grinding them to a powder and then boiling the powder to form a paste which is added to the drilling mud as in the case of cooked flour or starch. The psyllium seed flour may, however, be added directly to the drilling mud in dry form in the manner described hereinbefore for flour and starch.

The quebracho crystals are soluble in the mud and may be added thereto in any convenient manner although it may be convenient to prepare previously a concentrated solution of the quebracho and subsequently add the solution to the circulating mud stream.

The penetration tests were made under artificial conditions as nearly simulating actual subsurface well drilling conditions as possible and comprised circulating the mud mixtures at high pressures across the faces of formation test cores made from materials recovered from actual well coring operations. The test cores were so arranged that the high mud pressure differentials indicated in Table I could be maintained through them and so that the liquid penetrating the thickness of the formation could be recovered and accurately measured. The mud cake thicknesses were determined by removing the test cores from the testing apparatus and measuring them at the exposed edges. A more complete description of the above briefly described test method appears in the American Petroleum Institute paper, "Evaluation of rotary drilling muds" by P. H. Jones and E. C. Babson.

When the drill penetrates deep strata containing gas, under high pressure, gas tends to enter the bore hole and dissolve in or mix with the drilling fluid therein. As the fluid in its round of circulation moves upward from the drill and the gas containing formation toward the surface, the hydrostatic head of the fluid is progressively reduced, and this results in a release and expansion of the included gas. This release and expansion of gas in turn results in the permeation of the drilling fluid with gas bubbles which reduce its effective density and this reduction of density by gas permeation is known as "gas cutting." It is necessary, therefore, that the drilling fluid which is employed under such conditions be freed of gas at the surface before it is again recirculated to the gas containing formation where additional gas cutting results. Even though the amount of gas cutting of the drilling fluid is only slight at each cycle of circulation, it is important that it be freed at each return to the surface, for otherwise it may accumulate to a degree where the gas cutting is sufficient to reduce the overall density of the drilling fluid in the drill hole to such an extent that the hydrostatic head of the gas containing drilling fluid may be less than that of the gas in the formation. When this overbalance of formation pressure obtains, the result is often a "blow out" in which the drilling fluid is ejected from the drill hole by the gas pressure.

Ordinarily the gas is removed without special means by simply releasing the pressure on the mud at the surface of the drill hole and allowing the gas to extricate itself from the mud during a short period of relative quiescence or during the time it is passing through the ditches or sand separating apparatus. However, as the conditioned drilling fluids become more complex with resulting increase of viscosity, immobility and thixotropic properties, it becomes more difficult to effect a satisfactory separation of the gas. This is particularly true in the present case where formation penetration inhibiting agents are utilized in admixture with the drilling fluid. When the hereinbefore enumerated formation penetration inhibiting agents were utilized in admixture with drilling muds comprising solids in suspension in water and when they were exposed to conditions tending to cause gas cutting, a marked tendency to form stable gas-cut mud and foam was observed.

When stable gas-cut mud and foam is formed as a result of the presence in the drilling fluid under gas-cutting conditions of the hereinabove described formation penetration inhibitors, no practical amount of quiescence, agitation or circulation thereof in the ditches at the surface as heretofore commonly employed for the separation of gas, will effect satisfactory separation of the gas and reduction of the foam. The employment of formation penetration inhibitors alone under gas-cutting conditions and other conditions conductive to gas-cutting and foaming in the drilling fluid is therefore impractical.

It is necessary, therefore, in order to make practical use of the conditioned mud having desirably low formation penetration characteristics and containing formation penetration inhibitors, to combine therewith anti-gas-cutting agents, which are effective in counteracting the increased gas-cutting and stable foam-forming tendencies imparted to the drilling fluid by the presence of such formation penetration inhibitors.

Anti-gas-cutting agents which may be added in small quantities varying from 0.03% to 1.00% by weight of the drilling fluid and which have been found to be effective particularly in combination with drilling fluids containing formation penetrating inhibitors, or formation sealing agents are high boiling point alcohols, for example, the aliphatic alcohols, such as octyl alcohol and the alcohol of the terpene series, such as fenchyl alcohol; glycerin and other polyhydric alcohols; the fatty acids, coconut oil fatty acid, capryllic acid and the hydroxy and unsaturated derivatives of fatty acids, such as castor oil acids; the esters, glycol oleate, butyl stearate and glycerol monoricinoleate; the alcohols of the terpenes, terpineol and pine oil and fenchyl alcohol, and waxes, such as montan wax in mineral seal oil. Octyl alcohol and other alcohols of the aliphatic series having low solubilities in water and marked and favorable surface tension modifying effects are particularly effective in this respect. The anti-gas-cutting agents can be broadly classified as anti-foaming agents with the above subclassifications.

Table II indicates the beneficial effect of certain of the most effective one of the hereinbefore enumerated anti-gas-cutting agents upon muds which have been gas-cut and subsequently uniformly treated by agitation and settling to remove the included gas.

zoate of soda and zinc chloride in quantities approximating 0.1% by weight of the drilling fluid.

Other formation sealing agents which are effective in admixture with the mud or drilling fluid under certain conditions are listed together with the before-mentioned preferred formation sealing agents under their various physical and chemical classifications, as follows: the protein colloids, glue, casein, milk powder, blood albumin and gelatin; the carbohydrate colloids, gum arabic and gum copal; the gelatinous vegetable pastes or slimes, sea weed (algenic acid), agar agar, cottonseed meal, linseed cakes, wheat flour, corn starch, quebracho and psyllium seeds; the sugars, dextrose, molasses and corn syrup; the waxes, montan wax and the soaps, such as saponified montan wax.

All of these formation sealing agents can be broadly classified as organic colloids with the hereinbefore enumerated subclassifications.

The mechanism responsible for the successful performance of the formation sealing agents, such as the starchy and pasty materials and organic colloids in general may probably be due to the effects associated with the combination of hydrophilic colloids, such as those with the hydrophilic type of colloids usually present in drilling muds.

These formation penetration inhibitors and anti-gas-cutting agents have been effective with various drilling fluids having different compositions, but these drilling fluids generally comprise aqueous suspensions of solid matter, such as clay, bentonite, etc.

This invention, however, when applied to any drilling fluid, colloidal or non-colloidal in type,

Table II

| | Results of tests on gas-cut mud | | | | Initial gravity, lb./cu. ft. at 80° F. before gas cutting | Boiling point of anti-gas-cutting agent, ° F. |
|---|---|---|---|---|---|---|
| Gas-cut conditioned mud containing a formation penetration inhibitor | 1st period of agitation | | 2d period of agitation | | | |
| | Gravity lb./cu. ft. | Temp. ° F. | Gravity lb./cu. ft. | Temp. ° F. | | |
| 1  Mud B+1.0% flour | 40.0 | 145 | 40.0 | 125 | 70.0 | |
| 2  Same as (1)+0.2% castor oil fatty acid | 65.5 | 145 | 67.0 | 128 | 70.0 | 482 at 15 mm. Hg. |
| 3  Same as (1)+0.1% glycol oleate | 61.0 | 148 | 63.0 | 123 | 70.0 | Above 400. |
| 4  Same as (1)+0.1% butyl stearate | 64.5 | 142 | 68.5 | 118 | 70.0 | 428 at 25 mm. Hg. |
| 5  Same as (1)+0.1% glycerol monoricinoleate. | 62.0 | 140 | 65.0 | 120 | 70.0 | Above 400. |
| 6  Same as (1)+0.2% coconut fatty acid | 63.0 | 140 | 65.0 | 120 | 70.0 | 356 at 16 mm. Hg. |
| 7  Mud D+2.0% cooked starch | 40.0 | 130 | 40.0 | 78 | 75.0 | |
| 8  Same as (7)+0.03% octyl alcohol | 61.5 | 118 | 64.0 | 110 | 75.0 | 384. |

(B) Coalinga red mud+2.0% aqua gel+0.1% cresylic acid.
(D) Typical mud, origin unknown.

It is important that the anti-gas-cutting agents to be added in combination with the formation penetration inhibitors to the mud, have boiling points well above the maximum temperatures of the muds leaving the drill hole at the surface and circulating through the ditches, so that loss by evaporation shall be a minimum. The boiling points of the anti-gas-cutting agents are preferably well above 212° F., as shown in the above Table II.

When the hereinbefore described combination of organic formation penetration inhibitors and anti-gas-cutting agents are employed in the drilling fluids where temperatures are on the average favorable for biochemical changes it has been necessary to employ also in admixture therewith suitable germicides or preservatives. Such preservatives which have been effective in preserving the desirable characteristics of the conditioned mud are phenol, cresol, cresylic acid, benzoate of soda and zinc chloride in quantities approximating 0.1% by weight of the drilling fluid.

is effective in preventing the penetration of the drilled formations with the liquid portion of the drilling fluid, and the attendant weakening and frequent caving of the drill hole walls upon such fluid penetration. This invention, therefore, reduces to a minimum the dangers of "sticking" the drill pipe and tools and the possibility of the resultant loss of the well. This invention, moreover, reduces the dangers of "blow-outs" and loss of control of the drilling well by providing a drilling fluid of proper formation sealing properties while at the same time insuring sufficient freedom from gas-cutting and the maintenance of sufficient density and stability. This invention also reduces to a minimum the detrimental effect of drilling fluids upon producing horizons during drilling operations.

The foregoing is not to be limiting but may include all processes, drilling fluids and materials within the scope of the claims.

I claim:

1. An improved well drilling fluid having low gas-cutting tendencies comprising an aqueous suspension of heavy solids to which has been added a modicum of an ester of a fatty acid of the class consisting of glycol-oleate, butyl-stearate, and glycerolmonoricinoleate.

2. An improved well drilling fluid having low gas-cutting tendencies comprising an aqueous suspension of heavy solids to which has been added a modicum of glycol-oleate.

3. An improved well drilling fluid having low gas-cutting tendencies comprising an aqueous suspension of heavy solids to which has been added a modicum of butyl-stearate.

4. An improved well drilling fluid having low gas-cutting tendencies comprising an aqueous suspension of heavy solids to which has been added a modicum of glycerolmonoricinoleate.

5. An improved well drilling fluid having low gas-cutting tendencies according to claim 1 and containing a gelatinous formation penetration inhibitor.

PHILIP H. JONES.